(12) United States Patent
Gao et al.

(10) Patent No.: US 11,584,843 B2
(45) Date of Patent: Feb. 21, 2023

(54) OLEFIN-OLEFINIC ALCOHOL COPOLYMER, AND PREPARATION METHOD THEREFOR

(71) Applicants: CHINA PETROLEUM & CHEMICAL CORPORATION, Beijing (CN); BEIJING RESEARCH INSTITUTE OF CHEMICAL INDUSTRY, CHINA PETROLEUM & CHEMICAL CORPORATION, Beijing (CN)

(72) Inventors: Rong Gao, Beijing (CN); Zifang Guo, Beijing (CN); Junling Zhou, Beijing (CN); Dongbing Liu, Beijing (CN); Jie Fu, Beijing (CN); Jingjing Lai, Beijing (CN); Tingjie Huang, Beijing (CN); Shiyuan Xu, Beijing (CN); Xinyang Li, Beijing (CN)

(73) Assignees: CHINA PETROLEUM & CHEMICAL CORPORATION BEIJING RESEARCH INSTITUTE OF CHEMICAL INDUSTRY, Beijing (CN); CHINA PETROLEUM & CHEMICAL CORPORATION, Beijing (CN)

( * ) Notice: Subject to any disclaimer, the term of this patent is extended or adjusted under 35 U.S.C. 154(b) by 224 days.

(21) Appl. No.: 16/759,193

(22) PCT Filed: Oct. 24, 2018

(86) PCT No.: PCT/CN2018/111683
§ 371 (c)(1),
(2) Date: Apr. 24, 2020

(87) PCT Pub. No.: WO2019/080876
PCT Pub. Date: May 2, 2019

(65) Prior Publication Data
US 2020/0325315 A1  Oct. 15, 2020

(30) Foreign Application Priority Data
Oct. 24, 2017 (CN) .......................... 201711008112.1

(51) Int. Cl.
C08L 23/08 (2006.01)
C08F 210/02 (2006.01)
C08F 216/08 (2006.01)
C08F 2/38 (2006.01)
C08F 2/06 (2006.01)
C08F 4/70 (2006.01)
C08F 4/14 (2006.01)
C08F 216/06 (2006.01)

(52) U.S. Cl.
CPC ............... *C08L 23/08* (2013.01); *C08F 2/06* (2013.01); *C08F 2/38* (2013.01); *C08F 4/14* (2013.01); *C08F 4/7098* (2013.01); *C08F 210/02* (2013.01); *C08F 216/06* (2013.01); *C08L 2205/20* (2013.01)

(58) Field of Classification Search
CPC ........ C08F 210/02; C08F 216/06; C08F 2/06; C08F 4/7098; C08F 4/14; C08F 2/38; C08L 23/08
See application file for complete search history.

(56) References Cited

U.S. PATENT DOCUMENTS

| | | | |
|---|---|---|---|
| 4,220,543 A * | 9/1980 | Yamashita | B01D 71/38 521/64 |
| 5,032,632 A | 7/1991 | Saxton | |
| 2012/0095153 A1 | 4/2012 | Tokimune et al. | |

FOREIGN PATENT DOCUMENTS

| | | | |
|---|---|---|---|
| CN | 101250244 A | | 8/2008 |
| CN | 101982494 A | | 3/2011 |
| CN | 102311555 A | | 1/2012 |
| CN | 10-3030724 | * | 4/2013 |
| CN | 103030724 A | | 4/2013 |
| CN | 104558347 A | | 4/2015 |
| CN | 105131312 A | | 12/2015 |
| CN | 105646756 A | | 6/2016 |
| CN | 107163175 A | | 9/2017 |

* cited by examiner

*Primary Examiner* — Robert D Harlan
(74) *Attorney, Agent, or Firm* — Novick, Kim & Lee, PLLC; Allen Xue

(57) ABSTRACT

The invention provides an olefin-olefinic alcohol copolymer and a preparation method thereof, said copolymer comprising a spherical and/or spherical-like polymer. The copolymer provided by the invention exhibits a good morphology and has good prospects in industrial use.

24 Claims, 4 Drawing Sheets

OLEFIN-OLEFINIC ALCOHOL COPOLYMER, AND PREPARATION METHOD THEREFOR

CROSS-REFERENCE TO RELATED APPLICATIONS

This application is a U.S. national stage application of PCT international application PCT/CN2018/111683, filed on Oct. 24, 2018, which claims the priority of Chinese patent application CN 201711008112.1, entitled "Olefin-olefinic alcohol copolymer, and preparation method therefor" and filed on Oct. 24, 2017, the entirety of which is incorporated herein by reference.

FIELD OF THE INVENTION

The present invention relates to the technical field of olefin polymerization, and in particular, to an olefin-olefinic alcohol copolymer and a preparation method therefor.

BACKGROUND OF THE INVENTION

Polyolefin products are inexpensive, have excellent performance, and have a wide range of applications. Under the condition that original excellent physical and chemical properties of polyolefin are retained, the introduction of polar groups into the molecular chain of polyolefin through a chemical synthesis method can improve chemical inertness, the dyeing property, wettability, and compatibility with other materials thereof, giving new characteristics that raw materials do not have thereto. At present, high-pressure radical polymerization is mostly used in the industry to promote the direct copolymerization of an olefin and a polar monomer. For example, this method is used for all of ethylene-vinyl acetate, ethylene-methyl methacrylate, and ethylene-acrylic acid copolymers. Although copolymerized polar monomers can be directly introduced into the polyolefin chain by using high-pressure radical copolymerization, this method requires high-temperature and high-pressure conditions, high energy consumption, and expensive equipment costs.

Ethylene-vinyl alcohol (EVOH or EVAL) copolymer, a new-type polymer material that combines the processability of ethylene polymers and the gas barrier property of vinyl alcohol polymers, is one of the three major barrier resins industrially produced in the world, and is widely used for packaging food, medical solutions and other products. Since vinyl alcohol cannot exist independently as a monomer, it is usually produced by a process in which ethylene-vinyl acetate is subjected to a free radical polymerization to form a copolymer, and the copolymer is subjected to an alcoholysis reaction. However, the alcoholysis process requires a large amount of solvent. Moreover, the final saponified products contain a large amount of impurities such as acetic acid and alkali metal salts, and a large amount of water is required for washing.

Coordination catalysis copolymerization, as a polymer preparation technology at room temperature and atmospheric pressure, has received widespread attention for its significant role in reducing energy consumption and improving reaction efficiency. The participation of the catalyst in the reaction process greatly reduces the activation energy of the copolymerization reaction of olefin monomers and polar monomers, which is conducive to obtaining functional polymers having a higher molecular weight at lower temperatures and pressures. Currently, only a small amount of literature reports the use of transition metal complexes to catalyze the copolymerization of an olefin and an unsaturated alcohol. However, in the existing technologies, no matter which method is used for the polymerization, the obtained polymer is a thick sticky lumpy solid, which is easy to scale in the polymerization equipment, causing difficulties in polymer transportation, solvent removal, and granulation.

SUMMARY OF THE INVENTION

The present invention provides an olefin-olefinic alcohol copolymer, and the copolymer includes a spherical and/or spherical-like polymer. The spherical and/or spherical-like polymer may be obtained by direct polymerization of an olefin and an olefinic alcohol, and subsequent processing such as granulation is not needed. The copolymer exhibits a good morphology and has good prospects in industrial use.

According to a first aspect of the present invention, an olefin-olefinic alcohol copolymer is provided, which includes a spherical and/or spherical-like polymer.

According to a preferred embodiment of the present invention, in the copolymer, at least part of spherical and/or spherical-like polymers have a cavity therein.

According to a preferred embodiment of the present invention, the olefin-olefinic alcohol copolymer includes a structural unit derived from olefin and a structural unit derived from olefinic alcohol shown in Formula I,

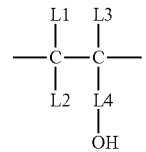

Formula I wherein in Formula I L1-L3 each are independently selected from the group consisting of H and $C_1$-$C_{30}$ alkyl, and L4 is $C_1$-$C_{30}$ alkylene having a side group; and the $C_1$-$C_{30}$ alkyl is optionally substituted by a substituent, and preferably the substituent is one or more selected from the group consisting of halogen, $C_1$-$C_{10}$ alkyl, $C_1$-$C_{10}$ alkoxy, $C_6$-$C_{10}$ aryl, cyano group and hydroxyl.

According to a preferred embodiment of the present invention, the side group in L4 is one or more selected from the group consisting of halogen, $C_6$-$C_{20}$ aryl, $C_1$-$C_{20}$ alkyl and $C_1$-$C_{20}$ alkoxy. The $C_6$-$C_{20}$ aryl, $C_1$-$C_{20}$ alkyl, and $C_1$-$C_{20}$ alkoxy are optionally substituted by a substituent, and preferably the substituent is one or more selected from the group consisting of halogen, $C_1$-$C_{10}$ alkyl, $C_1$-$C_{10}$ alkoxy, $C_6$-$C_{10}$ aryl and hydroxyl.

According to a preferred embodiment of the present invention, the side group in L4 is one or more selected from the group consisting of halogen, $C_6$-$C_{20}$ aryl, $C_1$-$C_{20}$ alkyl, $C_1$-$C_{20}$ alkyl substituted by hydroxyl, and $C_1$-$C_{20}$ alkyl substituted by alkoxy. Preferably, the side group is one or more selected from the group consisting of halogen, $C_6$-$C_{20}$ aryl, $C_1$-$C_{10}$ alkyl, $C_1$-$C_{10}$ alkyl substituted by hydroxyl, and $C_1$-$C_{10}$ alkyl substituted by alkoxy. More preferably, the side group is one or more selected from the group consisting of halogen, phenyl, $C_1$-$C_6$ alkyl, and $C_1$-$C_6$ alkyl substituted by hydroxyl. Examples of the $C_1$-$C_6$ alkyl include methyl, ethyl, n-propyl, isopropyl, n-butyl, isobutyl, tert-butyl, pentyl and hexyl.

According to a preferred embodiment of the present invention, in Formula I, L1 and L2 are H, L3 is H or $C_1$-$C_{30}$ alkyl, L4 is $C_1$-$C_{30}$ alkylene having a side group. The $C_1$-$C_{30}$ alkyl is optionally substituted by a substituent, and preferably the substituent is one or more selected from the group consisting of halogen, $C_1$-$C_{10}$ alkyl, $C_1$-$C_{10}$ alkoxy, $C_6$-$C_{10}$ aryl, cyano group and hydroxyl.

According to a preferred embodiment of the present invention, in Formula I, L1 and L2 are H, L3 is H, $C_1$-$C_{10}$ alkyl or $C_1$-$C_{10}$ alkyl substituted by halogen, preferably L3 is H or $C_1$-$C_{10}$ alkyl; and L4 is $C_1$-$C_{20}$ alkylene having a side group. For example, L4 is methylene having a side group, ethylidene having a side group, propylidene having a side group, butylidene having a side group, $C_5$ alkylene having a side group, $C_6$ alkylene having a side group, $C_7$ alkylene having a side group, $C_8$ alkylene having a side group, $C_9$ alkylene having a side group, $C_{10}$ alkylene having a side group, $C_{12}$ alkylene having a side group, $C_{14}$ alkylene having a side group, Cis alkylene having a side group, and $C_{20}$ alkylene having a side group, and preferably is $C_1$-$C_{10}$ alkylene having a side group.

According to a preferred embodiment of the present invention, in Formula I, L1 and L2 are H, L3 is H or $C_1$-$C_6$ alkyl; and L4 is $C_1$-$C_{10}$ alkylene having a side group.

In the present invention, the carbon number n of Cn alkylene refers to the number of C on the linear chain, excluding the number of C on the side group. For example, isopropylidene (—$CH_2$—$CH(CH_3)$—) in the present invention is called $C_2$ alkylene having a side group (methyl). According to a preferred embodiment of the present invention, a density of the spherical and/or spherical-like polymer is in a range of 0.3000-0.7500 g/cm$^3$. For example, the density may be 0.3000 g/cm$^3$, 0.3500 g/cm$^3$, 0.4000 g/cm$^3$, 0.4500 g/cm$^3$, 0.5000 g/cm$^3$, 0.5500 g/cm$^3$, 0.6000 g/cm$^3$, 0.6500 g/cm$^3$, 0.7000 g/cm$^3$, 0.7500 g/cm$^3$, or any value between them. Preferably, the density is in a range of 0.4000-0.6500 g/cm$^3$. The density is measured by using a method in GB/T6343-2009.

According to a preferred embodiment of the present invention, an average particle size of the spherical and/or spherical-like polymer is in a range of 0.1-50.0 mm. For example, the particle size may be 0.1 mm, 0.5 mm, 1.0 mm, 2.0 mm, 3.0 mm, 5.0 mm, 8.0 mm, 10.0 mm, 15.0 mm, 20.0 mm, 25.0 mm, 30.0 mm, 35.0 mm, 40.0 mm, 45.0 mm, 50.0 mm, or any value between them. Preferably, the average particle size is in a range of 0.5-20.0 mm.

According to a preferred embodiment of the present invention, a volume of the cavity in the spherical and/or spherical-like polymer having a cavity therein is in a range of 5-99% of a volume of the spherical and/or spherical-like polymer. For example, the volume of the cavity may be 5%, 8%, 10%, 15%, 20%, 25%, 30%, 35%, 40%, 45%, 50%, 60%, 70%, 80%, 90%, 95%, 99%, or any value between them, of the volume of the spherical and/or spherical-like polymer. Preferably, the volume of the cavity is in a range of 30-95% of the volume of the spherical and/or spherical-like polymer. More preferably, the volume of the cavity is in a range of 50-90% of the volume of the spherical and/or spherical-like polymer.

According to a preferred embodiment of the present invention, the spherical and/or spherical-like polymer having a cavity therein is a polymer of a core-shell structure. The cavity is the core, and a polymer layer wrapping the cavity is the shell. According to a preferred embodiment of the present invention, the cavity is spherical and/or spherical-like.

According to a preferred embodiment of the present invention, microsphere particles are distributed in the spherical and/or spherical-like polymer.

According to a preferred embodiment of the present invention, based on the total weight of the copolymer, a content of the microsphere particles is in a range of 5-70 wt %. For example, the content of the microsphere particles may be 5 wt %, 8 wt %, 10 wt %, 15 wt %, 20 wt %, 25 wt %, 30 wt %, 35 wt %, 40 wt %, 45 wt %, 50 wt %, 60 wt %, 70 wt %, or any value between them. Preferably, the content of the microsphere particles is in a range of 10-50 wt %.

According to a preferred embodiment of the present invention, an average particle size of the microsphere particles is in a range of 0.1-5.0 μm. For example, the average particle size of the microsphere particles may be 0.1 μm, 0.3 μm, 0.5 μm, 0.8 μm, 1.0 μm, 1.5 μm, 2.0 μm, 2.5 μm, 3.0 μm, 3.5 μm, 4.0 μm, 4.5 μm, 5.0 μm, or any value between them. Preferably, the average particle size of the microsphere particles is in a range of 0.3-3.0 μm.

According to a preferred embodiment of the present invention, a melting point of the olefin-olefinic alcohol copolymer is in a range of 45-130° C. For example, the melting point of the olefin-olefinic alcohol copolymer is 45° C., 50° C., 60° C., 70° C., 80° C., 90° C., 100° C., 110° C., 120° C., 130° C., or any value between them.

According to a preferred embodiment of the present invention, in the olefin-olefinic alcohol copolymer, a content of the structural unit shown in Formula I is in a range of 0.4-30.0 mol %. For example, the content of the structural unit shown in Formula I may be 0.4 mol %, 0.5 mol %, 0.7 mol %, 0.8 mol %, 1.0 mol %, 1.5 mol %, 2.0 mol %, 5.0 mol %, 8.0 mol %, 10.0 mol %, 15.0 mol %, 20.0 mol %, 25.0 mol %, 30.0 mol %, or any value between them. Preferably, the content of the structural unit shown in Formula I is in a range of 0.7-10.0 mol %.

According to a preferred embodiment of the present invention, a weight-average molecular weight of the olefin-olefinic alcohol copolymer is in a range of 30000-500000, and is preferably in a range of 33000-470000.

According to a preferred embodiment of the present invention, a molecular weight distribution of the olefin-olefinic alcohol copolymer is 4.0. For example, the molecular weight distribution of the olefin-olefinic alcohol copolymer may be 0.1, 0.5, 1.0, 1.5, 2.0, 2.5, 3.0, 3.5, 4.0, or any value between them. Preferably, the molecular weight distribution is in a range of 1.0-4.0.

According to a preferred embodiment of the present invention, the structural unit derived from the olefin includes a structural unit derived from $C_2$-$C_{16}$ olefin, and preferably includes a structural unit derived from $C_2$-$C_{16}$ α-olefin or from $C_3$-$C_{16}$ cycloolefin.

According to a preferred embodiment of the present invention, the α-olefin or the cycloolefin is monoolefine. For example, the structural unit derived from the olefin may be a structural unit derived from one or more of ethylene, propylene, 1-butene, 1-pentene, 1-hexene, 1-heptene, and 1-octene.

According to another aspect of the present invention, a preparation method for the olefin-olefinic alcohol copolymer is provided. The preparation method includes contacting an olefin and an olefinic alcohol shown in Formula II with a catalyst and optionally a chain transfer agent for reaction in the presence of an alkane solvent to obtain the copolymer;

Formula II

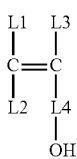

wherein in Formula II, definitions of L1-L4 are the same as the definitions of L1-L4 in Formula I.

The catalyst includes a main catalyst and a co-catalyst. The main catalyst is a metal complex shown in Formula III:

Formula III

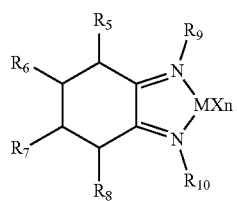

wherein in Formula III, $R_9$ and $R_{10}$ each are independently selected from the group consisting of substituted or unsubstituted hydrocarbyl; $R_5$-$R_8$ are identical to or different from each other, each are independently selected from the group consisting of H, halogen, and substituted or unsubstituted $C_1$-$C_{20}$ hydrocarbyl, and $R_9$ and $R_{10}$ optionally form a ring with each other; M is a Group VIII metal; X is one or more selected from the group consisting of halogen, hydrocarbyl and hydrocarbyloxy, and is preferably one or more selected from the group consisting of halogen and $C_1$-$C_{10}$ alkyl; and n is an integer that meets an M valence state.

According to a preferred embodiment of the present invention, $R_9$ and $R_{10}$ each are independently selected from the group consisting of substituted or unsubstituted aryl or substituted or unsubstituted aralkyl, and are preferably selected from the group consisting of substituted or unsubstituted $C_6$-$C_{30}$ aryl and substituted or unsubstituted $C_7$-$C_{30}$ aralkyl. Preferably, $R_9$ and $R_{10}$ each are independently selected from the group consisting of $C_6$-$C_{30}$ aryl substituted by $C_1$-$C_{10}$ hydrocarbyl or by $C_1$-$C_{10}$ hydrocarbyloxy, and are preferably selected from the group consisting of phenyl substituted by $C_1$-$C_{10}$ hydrocarbyl or by $C_1$-$C_{10}$ hydrocarbyloxy. More preferably, $R_9$ and $R_{10}$ are selected from the group consisting of phenyl substituted by $C_1$-$C_{10}$ alkyl or by $C_1$-$C_{10}$ alkyl oxy, for example, phenyl substituted by methyl, ethyl, isopropyl, n-propyl, isobutyl, n-butyl, tert-butyl, methoxyl, ethoxyl, isopropoxyl, n-propoxyl, isobutoxyl, n-butoxyl and/or tert-butoxyl.

According to a preferred embodiment of the present invention, in Formula III, $R_5$-$R_8$ are identical to or different from each other, each are independently selected from the group consisting of H and $C_1$-$C_{20}$ hydrocarbyl, and optionally form a ring with each other. Preferably, $R_5$-$R_8$ are identical to or different from each other, each are independently selected from the group consisting of H and $C_1$-$C_6$ alkyl, and preferably form a ring by bonding.

According to a preferred embodiment of the present invention, the main catalyst is a metal complex shown in Formula IV:

Formula IV

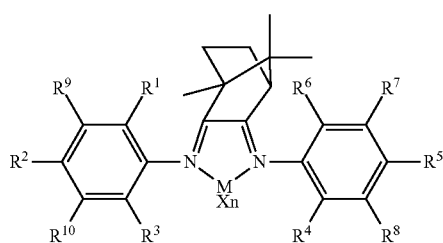

wherein in Formula IV, $R^1$-$R^{10}$ are identical to or different from each other, and each are independently selected from the group consisting of H, halogen, $C_1$-$C_{24}$ hydrocarbyl and $C_1$-$C_{24}$ hydrocarbyloxy, $R^1$-$R^3$, $R^9$, $R^{10}$ optionally forming a ring to each other, $R^4$-$R^6$, $R^7$, $R^8$ optionally forming a ring to each other; and M, X and n have the same definitions as those in Formula III.

According to a preferred embodiment of the present invention, in Formula III and Formula IV, the M is nickel.

According to a preferred embodiment of the present invention, the X is halogen, and is preferably Br or Cl.

According to a preferred embodiment of the present invention, in Formula IV, $R^1$-$R^{10}$ are identical to or different from each other, each are independently selected from the group consisting of H and $C_1$-$C_{10}$ alkyl, and are preferably selected from the group consisting of H and $C_1$-$C_6$ alkyl. Preferably, $R^7$-$R^{10}$ are H, and $R^1$-$R^6$ are identical to or different from each other and each are independently selected from the group consisting of H or $C_1$-$C_6$ alkyl; and more preferably, $R^7$-$R^{10}$ are H, and $R^1$-$R^6$ are identical to or different from each other, and each are independently selected from the group consisting of H and $C_1$-$C_4$ alkyl (including methyl, ethyl, n-propyl, isopropyl, butyl).

According to a preferred embodiment of the present invention, the main catalyst is one or more selected from the group consisting of the following complexes: Complex 1, in Formula IV, $R^1$-$R^6$ are all methyl, and $R^7$-$R^{10}$ are H;

Complex 2, in Formula IV, $R^1$-$R^6$ are all ethyl, and $R^7$-$R^{10}$ are H;

Complex 3, in Formula IV, 10-$R^6$ are all isopropyl, and $R^7$-$R^{10}$ are H;

Complex 4, in Formula IV, $R^1$-$R^6$ are all n-propyl, and $R^7$-$R^{10}$ are H;

Complex 5, in Formula IV, $R^1$-$R^6$ are all butyl, and $R^7$-$R^{10}$ are H;

Complex 6, in Formula IV, $R^1$, $R^3$, $R^4$, $R^6$ are all methyl, and $R^2$, $R^5$, $R^7$-$R^{10}$ are H;

Complex 7, in Formula IV, $R^1$, $R^3$, $R^4$, $R^6$ are all ethyl, and $R^2$, $R^5$, $R^7$–$10°$ are H;

Complex 8, in Formula IV, $R^3$, $R^4$, $R^6$ are all n-propyl, and $R^2$, $R^5$, $R^7$-$R^{10}$ are H;

Complex 9, in Formula IV, $R^1$, $R^3$, $R^4$, $R^6$ are all isopropyl, and $R^2$, $R^5$, $R^7$-$R^{10}$ are H;

Complex 10, in Formula IV, R', $R^3$, $R^4$, $R^6$ are all butyl, and $R^2$, $R^5$, $R^7$-$R^{10}$ are H.

According to a preferred embodiment of the present invention, the main catalyst is at least one selected from the group consisting of a compound shown in Formula a, a compound shown in Formula b and a compound shown in Formula c:

Formula a

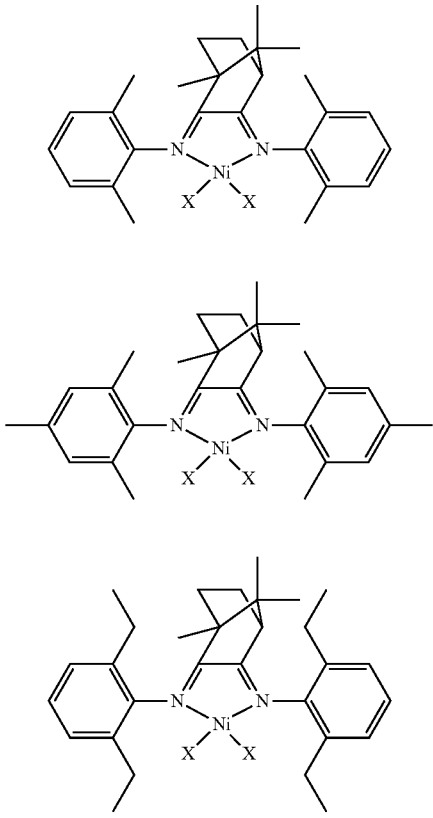

Formula b

Formula c wherein in Formula a, Formula b, and Formula c, X represents Br or Cl.

According to a preferred embodiment of the present invention, the main catalyst is at least one selected from the group consisting of complex a1, complex b1 and complex c1.

complex a1

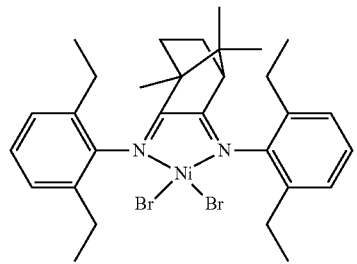

complex b1

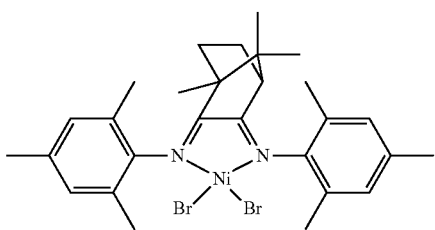

complex c1

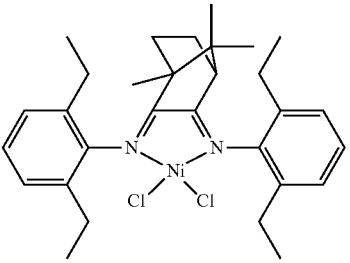

According to a preferred embodiment of the present invention, the co-catalyst is selected from the group consisting of an organic aluminum compound and an organic boron compound.

According to a preferred embodiment of the present invention, the organic aluminum compound is selected from the group consisting of alkyl aluminoxane or an organic aluminum compound having a general formula $AlR_nX^1_{3-n}$ (alkylaluminum or alkylaluminum halides). In the general formula $AlR_nX^1_{3-n}$, R is H, $C_1$-$C_{20}$ hydrocarbyl or $C_1$-$C_{20}$ hydrocarbyloxy, and is preferably $C_1$-$C_{20}$ alkyl, $C_1$-$C_{20}$ alkoxy, $C_7$-$C_{20}$ aralkyl, or $C_6$-$C_{20}$ aryl; and $X^1$ is halogen, and is preferably chlorine or bromine; and $0<n\leq3$. Specific examples of the organic aluminum compound include, but are not limited to, trimethylaluminum, triethylaluminum, triisobutylaluminum, tri-n-hexylaluminum, trioctylaluminum, diethylaluminum monohydrogen, diisobutylaluminum monohydrogen, diethylaluminum monochloride, diisobutylaluminum monochloride, ethylaluminum sesquichloride, ethylaluminum dichloride, methylaluminoxane (MAO) and modified methylaluminoxane (MMAO). Preferably, the organic aluminum compound is methylaluminoxane (MAO).

According to a preferred embodiment of the present invention, the organic boron compound is selected from the group consisting of aryl boron and/or borate. The aryl boron is preferably substituted or unsubstituted phenylboron, and is more preferably tris(pentafluorophenyl) boron.

The borate is preferably N, N-dimethylanilinium tetrakis (pentafluorophenyl) borate and/or triphenylmethylium tetrakis (pentafluorophenyl) borate.

According to a preferred embodiment of the present invention, a concentration of the main catalyst in the reaction system is in a range of 0.00001-100 mmol/L. For example, the concentration may be 0.00001 mmol/L, 0.00005 mmol/L, 0.0001 mmol/L, 0.0005 mmol/L, 0.001 mmol/L, 0.005 mmol/L, 0.01 mmol/L, 0.05 mmol/L, 0.1 mmol/L, 0.3 mmol/L, 0.5 mmol/L, 0.8 mmol/L, 1 mmol/L, 5 mmol/L, 8 mmol/L, 10 mmol/L, 20 mmol/L, 30 mmol/L, 50 mmol/L, 70 mmol/L, 80 mmol/L, 100 mmol/L, or any value between them. Preferably, the concentration is in a range of 0.0001-1 mmol/L. More preferably, the concentration is in a range of 0.001-0.5 mmol/L. According to a preferred embodiment of the present invention, when the co-catalyst is the organic aluminum compound, a molar ratio of aluminum in the co-catalyst and M in the main catalyst is in a range of (10-10000000):1. Preferably, the molar ratio is 10:1, 20:1, 50:1, 100:1, 200:1, 300:1, 500:1, 700:1, 800:1, 1000:1, 2000:1, 3000:1, 5000:1, 10000:1, 100000:1, 1000000:1, 10000000:1, or any value between them. Preferably, the molar ratio of aluminum in the co-catalyst and M in the main catalyst is (10-100000):1. More preferably, the molar ratio of aluminum in the co-catalyst and M in the main catalyst is in a range of (100-10000):1. When the co-catalyst is the organic boron compound, a molar ratio of boron in the co-catalyst and M in the main catalyst is in a range of (0.1-1000):1. For example, the molar ratio is 0.1:1, 0.2:1, 0.5:1, 1:1, 2:1, 3:1, 5:1, 8:1, 10:1, 20:1, 50:1, 100:1, 200:1, 300:1, 500:1, 700:1, 800:1, 1000:1, and any value between them. Preferably, the molar ratio of boron in the co-catalyst and M in the main catalyst is (0.1-500):1.

In some embodiments of the present invention, the olefin is ethylene or α-olefin having 3-16 carbon atoms.

In other embodiments of the present invention, the olefin is cycloolefin, and is preferably a 5-membered ring or a 6-membered ring.

According to a preferred embodiment of the present invention, in Formula II, L1-L3 each are independently selected from the group consisting of H, $C_1$-$C_{30}$ linear-chain alkyl, $C_1$-$C_{30}$ branched-chain alkyl, and $C_3$-$C_{30}$ cycloalkyl.

According to a preferred embodiment of the present invention, specific examples of the olefinic alcohol shown in Formula II include, but are not limited to, 2-methyl-3-buten-1-ol, 2-ethyl-3-buten-1-ol, 1,1-diphenyl-3-buten-1-ol, 2-methyl-3-buten-2-ol, 2,2-dimethyl-3-buten-1-ol, 3-methyl-1-penten-3-ol, 2,4-dimethyl-4-penten-2-ol, 4-alkenyl-2-pentanol, 4-methyl-4-penten ol, 2-methyl-4-penten-2-ol, 2-phenyl-4-penten-2-ol, 2-allyl hexafluoroisopropanol, 2-hydroxyl hexene, 3-buten-2-ol, 3-methyl-5-hexen-3-ol, 2-methyl-2-hydroxyl-5-hexene, 1-allylcyclohexanol, 2,3-dimethyl-2-hydroxyl-5-hexene, 1-heptylen-4-ol, 4-methyl-1-heptylen-4-ol, 4-n-propyl-1-heptyl-4-ol, 6-heptylen-3-ol, 2-methyl-2-hydroxyl-6-heptylene, 5-methyl-2-hydroxyl-6-heptylene, 2-hydroxyl-3-methyl-6-heptylene, 2-hydroxyl-3-ethyl-6-heptylene, 2-hydroxyl-4-methyl-6-heptylene, 2-hydroxyl-5-methyl-6-heptylene, 2,5-dimethyl-1-heptylen-4-ol, 2,6-dimethyl-7-octylene-2-ol, 2-hydroxyl-2,4,5-trimethyl-6-heptylene, 2-methyl-3-hydroxyl-7-octylene, 3-methyl-3-hydroxyl-6-heptylene, 2-methyl-2-hydroxyl-7-octylene, 3-methyl-3-hydroxyl-7-octylene, 4-methyl-2-hydroxyl-7-octylene, 4-methyl-3-hydroxyl-7-octylene, 5-methyl-3-hydroxyl-7-octylene, 6-methyl-3-hydroxyl-7-octylene, 3-ethyl-3-hydroxyl-7-octylene, 1,2-dihydroxyl-7-octylene, 2,6-dimethyl-2,6-dihydroxyl-7-octylene, 2,6-dimethyl-2,3-dihydroxyl-7-octylene, 2-methyl-2-hydroxyl-3-chloro-7-octylene, 2-methyl-2-hydroxyl-3,5-dichloro-7-octylene, 3,4-dimethyl-4-hydroxyl-8-nonylene, 4-methyl-4-hydroxyl-8-nonylene, 4-ethyl-4-hydroxyl-8-nonylene, 4-propyl-4-hydroxyl-8-nonylene, 7-octylene-2-ol, 3,5-dichloro-2-methyl-7-octylen-2-ol, 3-chloro-2-methyl-7-octylen-2,3-diol, and 2,6-dimethyl-7-octylen-2,6-diol.

According to a preferred embodiment of the present invention, a concentration of the olefinic alcohol shown in Formula II in the reaction system is in a range of 0.01-6000 mmol/L, preferably in a range of 0.1-1000 mmol/L, more preferably in a range of 1-500 mmol/L. For example, the concentration of the olefinic alcohol shown in Formula II in the reaction system may be 1 mmol/L, 10 mmol/L, 20 mmol/L, 30 mmol/L, 50 mmol/L, 70 mmol/L, 90 mmol/L, 100 mmol/L, 200 mmol/L, 300 mmol/L, 400 mmol/L, 500 mmol/L, or any value between them.

According to a preferred embodiment of the present invention, the chain transfer agent is selected from the group consisting of aluminum alkyl, magnesium alkyl and zinc alkyl.

According to a preferred embodiment of the present invention, the chain transfer agent is trialkylaluminum and/or dialkyl zinc, and is preferably one or more selected from the group consisting of trimethylaluminum, triethylaluminum, triisopropylaluminum, triisobutylaluminum, tri-n-hexylaluminum, tri-n-octylaluminum, dimethylzinc and diethylzinc.

According to a preferred embodiment of the present invention, a molar ratio of the chain transfer agent and M in the main catalyst is (0.1-2000):1. For example, the molar ratio of the chain transfer agent and M in the main catalyst may be 0.1:1, 0.2:1, 0.5:1, 1:1, 2:1, 3:1, 5:1, 8:1, 10:1, 20:1, 50:1, 100:1, 200:1, 300:1, 500:1, 600:1, 800:1, 1000:1, 2000:1, and any value between them. Preferably, the molar ratio of the chain transfer agent and M in the main catalyst is (10-600):1.

According to a preferred embodiment of the present invention, the alkane solvent is one or more selected from the group consisting of $C_3$-$C_{20}$ alkane. For example, the alkane solvent may be butane, isobutane, pentane, hexane, heptane, octane, and cyclohexane. Preferably, the alkane solvent is one or more of hexane, heptane, and cyclohexane.

According to a preferred embodiment of the present invention, the olefinic alcohol is subjected to a pre-processing of removing active hydrogen in advance. Preferably, the co-catalyst or the chain transfer agent above is used to perform a pre-processing to the olefinic alcohol so as to remove active hydrogen of a hydroxyl in the olefinic alcohol. Preferably, in the process of the pre-processing, a molar ratio of hydroxyl in the olefinic alcohol and the co-catalyst or the chain transfer agent is in a range of 10:1-1:10.

According to a preferred embodiment of the present invention, the reaction is performed under water-free and oxygen-free conditions.

According to a preferred embodiment of the present invention, reaction conditions include: a reaction temperature of −50° C.-50° C., preferably −20-50° C., more preferably 0-50° C., for example, 0° C., 10° C., 20° C., 30° C., 40° C., 50° C., and any value between them; and/or a reaction time length of 10-200 min, preferably 20-60 min. It is founded by the inventor of the present application, through research, that a temperature within the above temperature range is beneficial for the preparation of the spherical and/or spherical-like polymer.

In the present invention, there is no particular limitation to the reaction pressure, and a pressure is acceptable as long as a coordination copolymerization reaction of monomers can be performed. When the olefin is ethylene, in order to reduce cost and simplify the polymerization process, in a reactor, a pressure for ethylene is preferably 1-1000 atm, further preferably 1-200 atm, more preferably 1-50 atm.

In the present invention, the "reaction system" refers to the entirety formed by the solvent, the olefin, the olefinic alcohol monomer, the catalyst, and optionally the chain transfer agent.

In the present invention, the particle size of the spherical and/or spherical-like polymer herein is regarded as being equivalent to a diameter of a sphere having the same volume as the particle.

In the present invention, "substitute" in the wording of "substituted or unsubstituted" means that C or H atoms in a group defined (such as an olefin or an alkane) are optionally substituted by a substituent, and the substituent is selected from the group consisting of halogen, hydrocarbyl (such as $C_1$-$C_{10}$ alkyl), oxo(—O—), and groups containing oxygen, nitrogen, boron, sulfur, phosphorus, silicon, germanium and tin atoms.

In the present invention, "hydrocarbyl" and "alkyl", unless otherwise stated, include linear-chain, branched-chain or cyclic "hydrocarbyl" and "alkyl". In the present invention, "hydrocarbyl", unless otherwise stated, includes aliphatic hydrocarbyl or aromatic hydrocarbyl, and aliphatic hydrocarbyl includes alkyl, olefin, and alkynyl.

According to another aspect of the present invention, use of the olefin-olefinic alcohol copolymer as a foaming polyolefin material is provided.

In the present invention, by selecting olefinic alcohol monomers and catalysts for reaction and a proper polymerization process, a spherical and/or spherical-like polymer having a good morphology is prepared directly. The obtained polymerization product is not easy to scale in the reactor and is convenient for transportation. At least part of the obtained spherical and/or spherical-like polymers have a hallow structure, can be used as a foaming material without undergoing a foaming process, and have good prospects in industrial use.

The method for preparing the olefin-olefinic alcohol copolymer provided in the present invention, compared with the process for preparing the olefin-olefinic alcohol copolymer in existing industry, eliminates the step of saponification reaction and has a simpler preparation process.

BRIEF DESCRIPTION OF THE DRAWINGS

The accompanying drawings are provided for further understanding to the present invention, constitute one part of the description, are used for explaining the present invention together with embodiments of the present invention, and do not constitute limitation to the present invention. In the drawings.

DETAILED DESCRIPTION OF THE EMBODIMENTS

Figure 1:
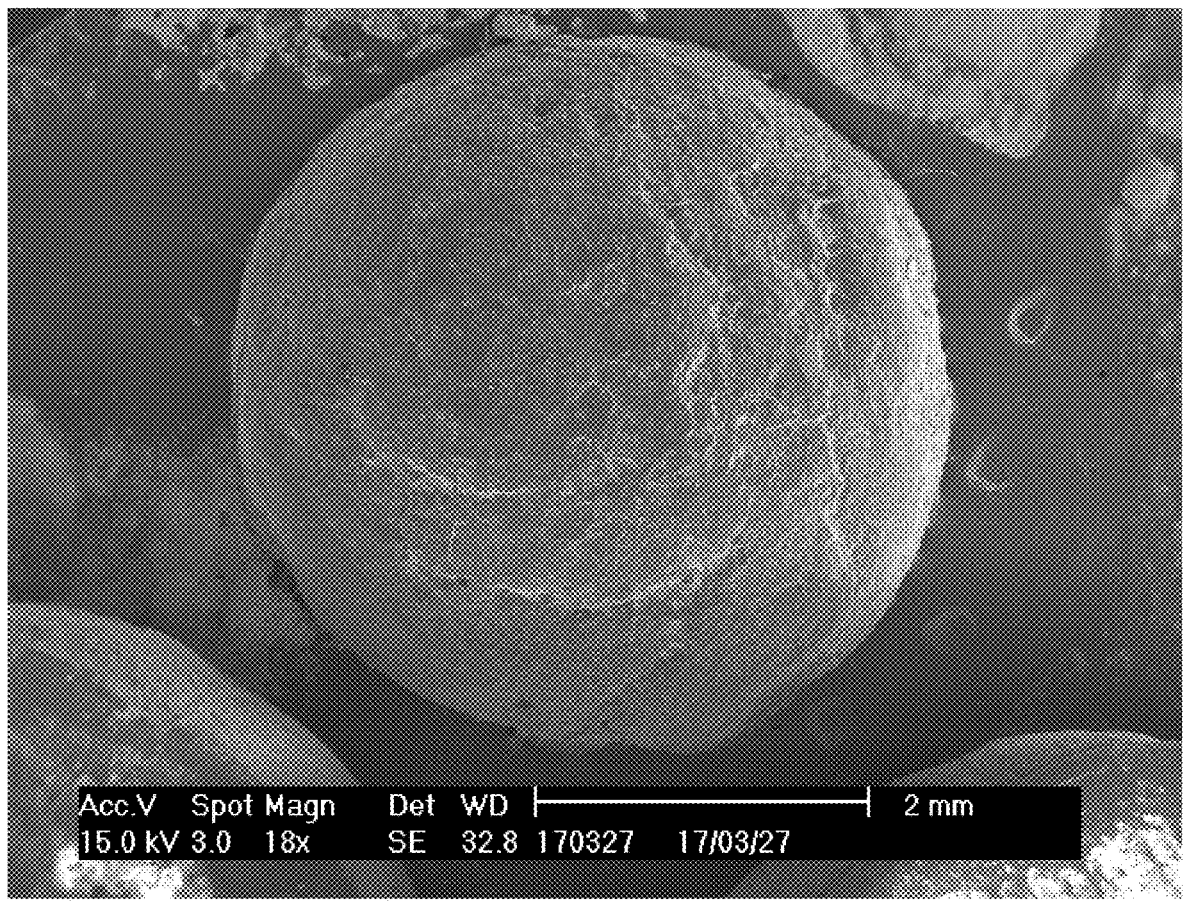
FIG. 1 is an electron micrograph of a spherical and/or spherical-like polymer obtained in Example 2 of the present invention.
Figure 2:
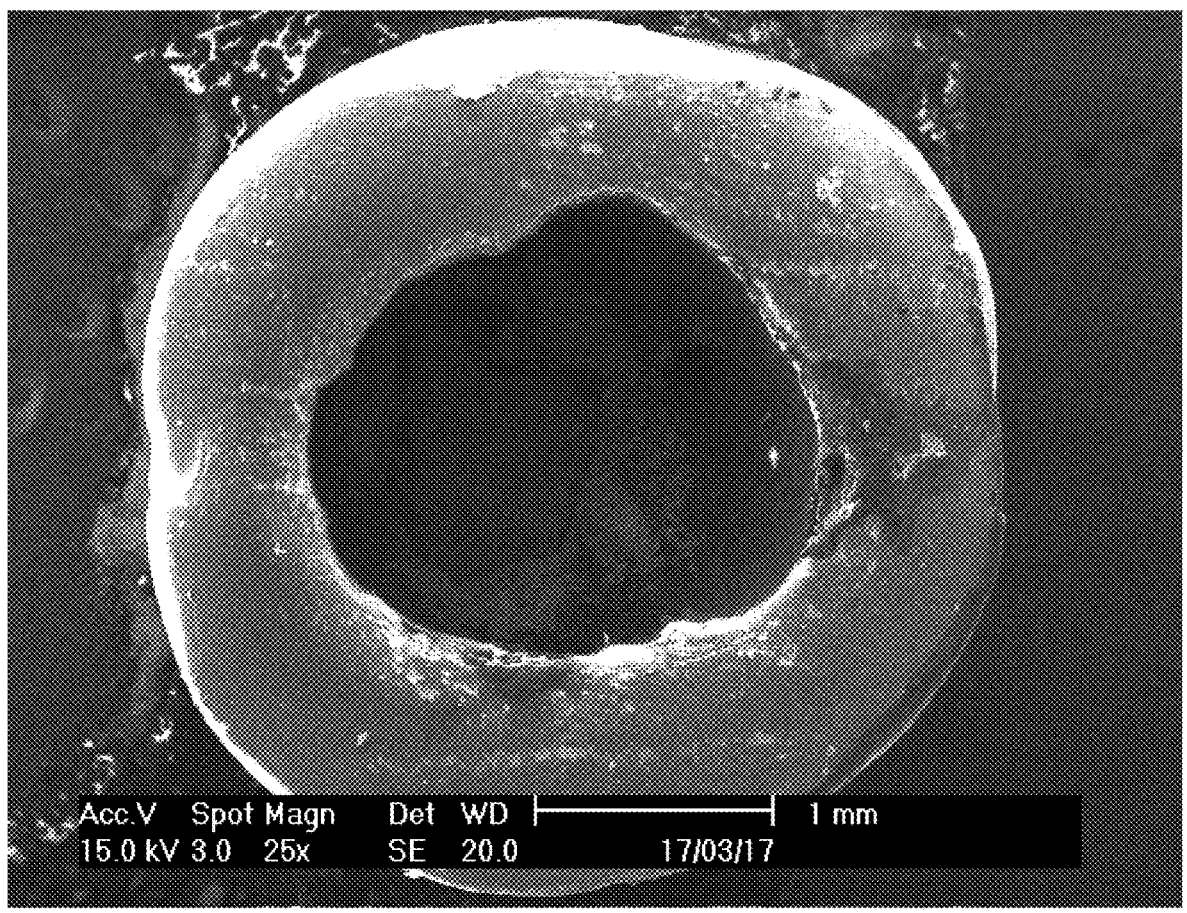
FIG. 2 is an electron micrograph of a cross-section of a spherical and/or spherical-like polymer having a cavity therein obtained in Example 2 of the present invention.
Figure 3:
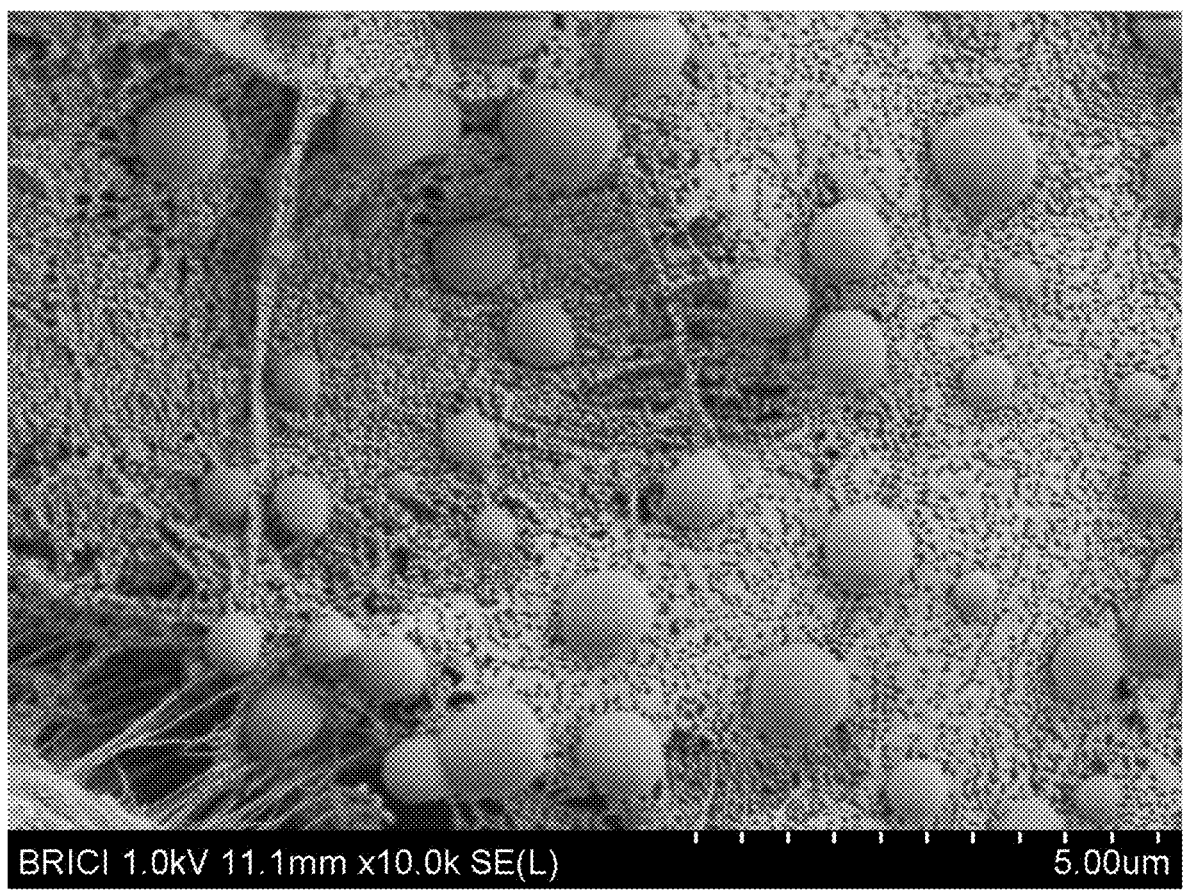
FIG. 3 is an electron micrograph of an outer surface of the spherical and/or spherical-like polymer having a cavity therein obtained in Example 2 of the present invention.
Figure 4:
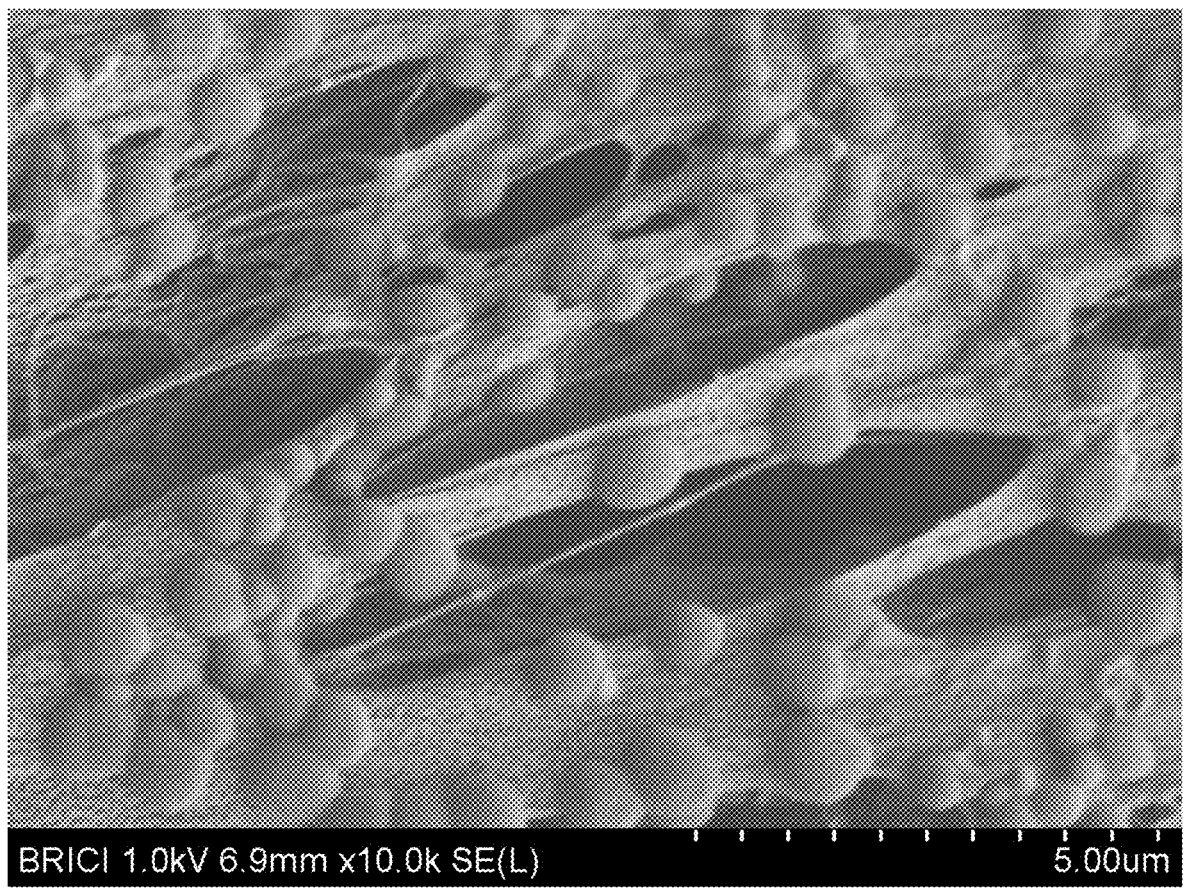
FIG. 4 is an electron micrograph of an inner surface of the spherical and/or spherical-like polymer having a cavity therein obtained in Example 2 of the present invention.

The present invention is described in detail in conjunction with examples below, but the present invention is not limited by the following examples.

The results of the present invention were characterized by the following manners.

A content of alcohol in the copolymer (a content of the structural unit derived from the olefinic alcohol shown in Formula I) was measured by using $^{13}C$ NMR, on a 400 MHz Bruker Avance 400 nuclear magnetic resonance spectrometer, with a 10 mm PASEX 13 probe, through dissolution of a polymer sample with 1,2,4-trichlorobenzene at 120° C. and analysis and testing.

A molecular weight and a molecular weight distribution PDI (PDI=Mw/Mn) of the copolymer was measured by using PL-GPC220, with the trichlorobenzene as the solvent at 150° C. (standard sample: PS; flow velocity: 1.0 mL/min; and column: 3×Plgel 10 um M1×ED-B 300×7.5 nm).

A melting point of the copolymer was tested by using the differential scanning calorimetry (DSC). A sample of 10 mg was placed in a crucible, and was measured at a Pekin Elmer DSC 8500 differential scanning calorimeter. Under a nitrogen atmosphere, the temperature was increased from 0° C. to 180° C. at an increasing rate of 10° C./min and maintained for 1 min, and decreased to 10° C. at a rate of 10° C./min and maintained for 3 min. After that, the temperature was increased to 180° C. at the increasing rate of 10° C./min, and scanning data during the second temperature increasing was recorded.

A density of the polymer was tested by using GB/T1033-1986 and GB/T6343-2009 respectively. When the testing was performed by using GB/T1033-1986, the test object was randomly selected from the copolymerization product. In the case that the testing was performed by using GB/T6343-2009, the test object was randomly selected from the spherical and/or spherical-like polymers when the copolymer contains spherical and/or spherical-like polymers, and the test object was randomly selected from the copolymerization product when the copolymer did not contain spherical and/or spherical-like polymers.

A particle size of the spherical and/or spherical-like polymers was tested by using ASTM D1921.

Structures of complex h and complex g are shown in Formula h and Formula g.

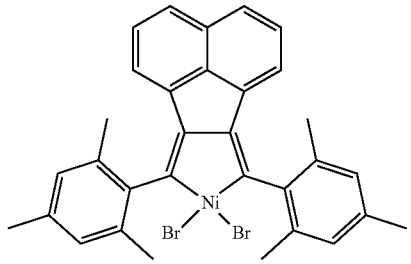

Formula h

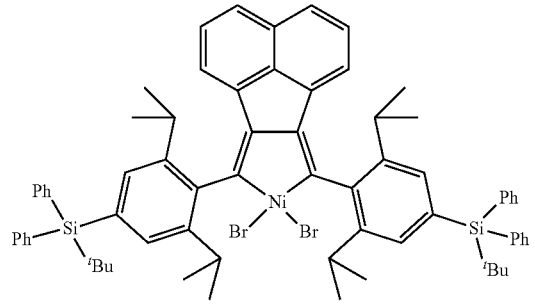

Formula g

Example 1

An 1 L stainless steel polymerization kettle equipped with a mechanical stirrer was continuously dried for 6 hours at 130° C., evacuated to vacuum while hot, and replaced with $N_2$ gas for 3 times. 500 mL of hexane was injected into the polymerization system, and meanwhile 2.5 μmol (1.6 mg) of complex a1, 15 mmol (2.5 mL) of 2-methyl-2-hydroxyl-7-octene, 15 mL of $AlEt_3$ (1.0 mol/L of hexane solution), and 3 mL of MAO (1.53 mol/L toluene solution) were added. The reaction was performed for 30 min by stirring at 20° C. and at an ethylene pressure of 10 atm. Finally, an ethanol solution acidified with 5% by volume hydrochloric acid was used for neutralization so as to obtain the polymer. Polymerization activity and performance parameters of the polymer are shown in Table 1.

Example 2

An 1 L stainless steel polymerization kettle equipped with a mechanical stirrer was continuously dried for 6 hours at 130° C., evacuated to vacuum while hot, and replaced with N₂ gas for 3 times. 500 mL of hexane was injected into the polymerization system, and meanwhile 2.5 µmol (1.6 mg) of complex al, and 30 mmol (5.1 mL) of 2-methyl-2-hydroxyl-7-octene, 30 mL of AlEt₃ (1.0 mol/L of hexane solution), 3 mL of MAO (1.53 mol/L toluene solution) were added. The reaction was performed for 30 min by stirring at 20° C. and at an ethylene pressure of 10 atm. Finally, an ethanol solution acidified with 5% by volume hydrochloric acid was used for neutralization so as to obtain the polymer. Polymerization activity and performance parameters of the polymer are shown in Table 1.

Example 3 (Comparison)

An 1 L stainless steel polymerization kettle equipped with a mechanical stirrer was continuously dried for 6 hours at 130° C., evacuated to vacuum while hot, and replaced with N₂ gas for 3 times. 500 mL of hexane was injected into the polymerization system, and meanwhile 2.5 µmol (1.6 mg) of complex al, 30 mmol (5.1 mL) of 2-methyl-2-hydroxyl-7-octene, 30 mL of AlEt₃ (1.0 mol/L of hexane solution), and 3 mL of MAO (1.53 mol/L toluene solution) were added. The reaction was performed for 30 min by stirring at 60° C. and at an ethylene pressure of 10 atm. Finally, an ethanol solution acidified with 5% by volume hydrochloric acid was used for neutralization so as to obtain the polymer. Polymerization activity and performance parameters of the polymer are shown in Table 1.

Example 4

An 1 L stainless steel polymerization kettle equipped with a mechanical stirrer was continuously dried for 6 hours at 130° C., evacuated to vacuum while hot, and replaced with N₂ gas for 3 times. 500 mL of hexane was injected into the polymerization system, and meanwhile 2.5 µmol (1.6 mg) of complex al, 30 mmol (5.1 mL) of 2-methyl-2-hydroxyl-7-octene, 30 mL of AlEt₃ (1.0 mol/L of hexane solution), 0.25 mL of diethylzinc (1 mol/L of hexane solution), and 3 mL of MAO (1.53 mol/L toluene solution) were added. The reaction was performed for 30 min by stirring at 20° C. and at an ethylene pressure of 10 atm. Finally, an ethanol solution acidified with 5% by volume hydrochloric acid was used for neutralization so as to obtain the polymer. Polymerization activity and performance parameters of the polymer are shown in Table 1.

Example 5

An 1 L stainless steel polymerization kettle equipped with a mechanical stirrer was continuously dried for 6 hours at 130° C., evacuated to vacuum while hot, and replaced with N₂ gas for 3 times. 500 mL of hexane was injected into the polymerization system, and meanwhile 2.5 µmol (1.6 mg) of complex al, 30 mmol (5.1 mL) of 2-methyl-2-hydroxyl-7-octene, 30 mL of AlEt₃ (1.0 mol/L of hexane solution), 0.5 mL of diethylzinc (1 mol/L of hexane solution), and 3 mL of MAO (1.53 mol/L toluene solution) were added. The reaction was performed for 30 min by stirring at 20° C. and at an ethylene pressure of 10 atm. Finally, an ethanol solution acidified with 5% by volume hydrochloric acid was used for neutralization so as to obtain the polymer. Polymerization activity and performance parameters of the polymer are shown in Table 1.

Example 6 (Comparison)

An 1 L stainless steel polymerization kettle equipped with a mechanical stirrer was continuously dried for 6 hours at 130° C., evacuated to vacuum while hot, and replaced with N₂ gas for 3 times. 500 mL of hexane was injected into the polymerization system, and meanwhile 2.5 µmol (1.6 mg) of complex al, 30 mmol (5.1 mL) of 2-methyl-2-hydroxyl-7-octene, 30 mL of AlEt₃ (1.0 mol/L of hexane solution), and 3 mL of MAO (1.53 mol/L toluene solution) were added. The reaction was performed for 30 min by stirring at 80° C. and at an ethylene pressure of 10 atm. Finally, an ethanol solution acidified with 5% by volume hydrochloric acid was used for neutralization so as to obtain the polymer. Polymerization activity and performance parameters of the polymer are shown in Table 1.

Example 7

An 1 L stainless steel polymerization kettle equipped with a mechanical stirrer was continuously dried for 6 hours at 130° C., evacuated to vacuum while hot, and replaced with N₂ gas for 3 times. 500 mL of hexane was injected into the polymerization system, and meanwhile 2.5 µmol (1.6 mg) of complex al, 50 mmol (8.5 mL) of 2-methyl-2-hydroxyl-7-octene, 50 mL of AlEt₃ (1.0 mol/L of hexane solution), and 3 mL of MAO (1.53 mol/L toluene solution) were added. The reaction was performed for 30 min by stirring at 20° C. and at an ethylene pressure of 10 atm. Finally, an ethanol solution acidified with 5% by volume hydrochloric acid was used for neutralization so as to obtain the polymer. Polymerization activity and performance parameters of the polymer are shown in Table 1.

Example 8

An 1 L stainless steel polymerization kettle equipped with a mechanical stirrer was continuously dried for 6 hours at 130° C., evacuated to vacuum while hot, and replaced with N₂ gas for 3 times. 500 mL of hexane was injected into the polymerization system, and meanwhile 2.5 µmol (1.6 mg) of complex al, 100 mmol (17.0 mL) of 2-methyl-2-hydroxyl-7-octene, 100 mL of AlEt₃ (1.0 mol/L of hexane solution), and 3 mL of MAO (1.53 mol/L toluene solution) were added. The reaction was performed for 30 min by stirring at 20° C. and at an ethylene pressure of 10 atm. Finally, an ethanol solution acidified with 5% by volume hydrochloric acid was used for neutralization so as to obtain the polymer. Polymerization activity and performance parameters of the polymer are shown in Table 1.

Example 9

An 1 L stainless steel polymerization kettle equipped with a mechanical stirrer was continuously dried for 6 hours at 130° C., evacuated to vacuum while hot, and replaced with N₂ gas for 3 times. 500 mL of hexane was injected into the polymerization system, and meanwhile 2.5 µmol (1.6 mg) of complex al, 30 mmol (4.1 mL) of 3-methyl-5-hexen-3-ol, 30 mL of AlEt₃ (1.0 mol/L of hexane solution), and 3 mL of MAO (1.53 mol/L toluene solution) were added. The reaction was performed for 30 min by stirring at 20° C. and at an ethylene pressure of 10 atm. Finally, an ethanol solution acidified with 5% by volume hydrochloric acid was used for neutralization so as to obtain the polymer. Polymerization activity and performance parameters of the polymer are shown in Table 1.

Example 10

An 1 L stainless steel polymerization kettle equipped with a mechanical stirrer was continuously dried for 6 hours at 130° C., evacuated to vacuum while hot, and replaced with N$_2$ gas for 3 times. 500 mL of hexane was injected into the polymerization system, and meanwhile 2.5 μmol (1.5 mg) of complex b1, 30 mmol (5.1 mL) of 2-methyl-2-hydroxyl-7-octene, 30 mL of AlEt$_3$ (1.0 mol/L of hexane solution), and 3 mL of MAO (1.53 mol/L toluene solution) were added. The reaction was performed for 30 min by stirring at 20° C. and at an ethylene pressure of 10 atm. Finally, an ethanol solution acidified with 5% by volume hydrochloric acid was used for neutralization so as to obtain the polymer. Polymerization activity and performance parameters of the polymer are shown in Table 1.

Example 11

An 1 L stainless steel polymerization kettle equipped with a mechanical stirrer was continuously dried for 6 hours at 130° C., evacuated to vacuum while hot, and replaced with N$_2$ gas for 3 times. 500 mL of hexane was injected into the polymerization system, and meanwhile 2.5 μmol (1.5 mg) of complex b1, 50 mmol (8.5 mL) of 2-methyl-2-hydroxyl-7-octene, 50 mL of AlEt$_3$ (1.0 mol/L of hexane solution), and 3 mL of MAO (1.53 mol/L toluene solution) were added. The reaction was performed for 30 min by stirring at 20° C. and at an ethylene pressure of 10 atm. Finally, an ethanol solution acidified with 5% by volume hydrochloric acid was used for neutralization so as to obtain the polymer. Polymerization activity and performance parameters of the polymer are shown in Table 1.

Example 12

An 1 L stainless steel polymerization kettle equipped with a mechanical stirrer was continuously dried for 6 hours at 130° C., evacuated to vacuum while hot, and replaced with N$_2$ gas for 3 times. 500 mL of hexane was injected into the polymerization system, and meanwhile 2.5 μmol (1.5 mg) of complex b1, 30 mmol (4.5 mL) of 4-methyl-1-heptylen-4-ol, 30 mL of AlEt$_3$ (1.0 mol/L of hexane solution), and 3 mL of MAO (1.53 mol/L toluene solution) were added. The reaction was performed for 30 min by stirring at 20° C. and at an ethylene pressure of 10 atm. Finally, an ethanol solution acidified with 5% by volume hydrochloric acid was used for neutralization so as to obtain the polymer. Polymerization activity and performance parameters of the polymer are shown in Table 1.

Example 13

An 1 L stainless steel polymerization kettle equipped with a mechanical stirrer was continuously dried for 6 hours at 130° C., evacuated to vacuum while hot, and replaced with N$_2$ gas for 3 times. 500 mL of hexane was injected into the polymerization system, and meanwhile 2.5 μmol (1.4 mg) of complex c1, 30 mmol (5.1 mL) of 2-methyl-2-hydroxyl-7-octene, 30 mL of AlEt$_3$ (1.0 mol/L of hexane solution), and 3 mL of MAO (1.53 mol/L toluene solution) were added. The reaction was performed for 30 min by stirring at 20° C. and at an ethylene pressure of 10 atm. Finally, an ethanol solution acidified with 5% by volume hydrochloric acid was used for neutralization so as to obtain the polymer. Polymerization activity and performance parameters of the polymer are shown in Table 1.

Example 14

An 1 L stainless steel polymerization kettle equipped with a mechanical stirrer was continuously dried for 6 hours at 130° C., evacuated to vacuum while hot, and replaced with N$_2$ gas for 3 times. 500 mL of hexane was injected into the polymerization system, and meanwhile 2.5 μmol (1.6 mg) of complex a1, 30 mmol (5.1 mL) of 2-methyl-2-hydroxyl-7-octene, and 30 mL of AlEt$_3$ (1.0 mol/L of hexane solution) were added; and 2.5 mL of toluene solution of N, N-dimethylanilinium tetrakis (pentafluorophenyl) borate (1 mmol/L toluene solution) was added, making Ni/B=1. The reaction was performed for 30 min by stirring at 20° C. and at an ethylene pressure of 10 atm. Finally, an ethanol solution acidified with 5% by volume hydrochloric acid was used for neutralization so as to obtain the polymer. Polymerization activity and performance parameters of the polymer are shown in Table 1.

Example 15

An 1 L stainless steel polymerization kettle equipped with a mechanical stirrer was continuously dried for 6 hours at 130° C., evacuated to vacuum while hot, and replaced with N$_2$ gas for 3 times. 500 mL of hexane was injected into the polymerization system, and meanwhile 2.5 μmol (1.6 mg) of complex a1, 30 mmol (5.1 mL) of 2-methyl-2-hydroxyl-7-octene, and 30 mL of AlEt$_3$ (1.0 mol/L of hexane solution) were added; and 3 mL of AlEt$_2$C$_1$ (2 mmol/L hexane solution) were added. The reaction was performed for 30 min by stirring at 20° C. and at an ethylene pressure of 10 atm. Finally, an ethanol solution acidified with 5% by volume hydrochloric acid was used for neutralization so as to obtain the polymer. Polymerization activity and performance parameters of the polymer are shown in Table 1.

Example 16

An 1 L stainless steel polymerization kettle equipped with a mechanical stirrer was continuously dried for 6 hours at 130° C., evacuated to vacuum while hot, and replaced with N$_2$ gas for 3 times. 500 mL of hexane was injected into the polymerization system, and meanwhile 5.0 μmol (3.2 mg) of complex a1, 30 mmol (5.1 mL) of 2-methyl-2-hydroxyl-7-octene, 30 mL of AlEt$_3$ (1.0 mol/L of hexane solution), and 3 mL of MAO (1.53 mol/L toluene solution) were added. The reaction was performed for 30 min by stirring at 20° C. and at an ethylene pressure of 10 atm. Finally, an ethanol solution acidified with 5% by volume hydrochloric acid was used for neutralization so as to obtain the polymer. Polymerization activity and performance parameters of the polymer are shown in Table 1.

Comparative Example 1

An 1 L stainless steel polymerization kettle equipped with a mechanical stirrer was continuously dried for 6 hours at 130° C., evacuated to vacuum while hot, and replaced with N$_2$ gas for 3 times. 500 mL of hexane was injected into the polymerization system, and meanwhile 2.5 μmol (1.6 mg) of complex a1, and 3 mL of MAO (1.53 mol/L toluene solution) were added. The reaction was performed for 30 min by stirring at 20° C. and at an ethylene pressure of 10 atm. Finally, an ethanol solution acidified with 5% by volume hydrochloric acid was used for neutralization so as to obtain the polymer. Polymerization activity and performance parameters of the polymer are shown in Table 1.

Comparative Example 2

An 1 L stainless steel polymerization kettle equipped with a mechanical stirrer was continuously dried for 6 hours at 130° C., evacuated to vacuum while hot, and replaced with N₂ gas for 3 times. 500 mL of hexane was injected into the polymerization system, and meanwhile 2.5 μmol (1.6 mg) of complex h, 30 mmol (5.1 mL) of 2-methyl-2-hydroxyl-7-octene, 30 mL of AlEt₃ (1.0 mol/L of hexane solution), and 3 mL of MAO (1.53 mol/L toluene solution) were added. The reaction was performed for 30 min by stirring at 20° C. and at an ethylene pressure of 10 atm. Finally, an ethanol solution acidified with 5% by volume hydrochloric acid was used for neutralization so as to obtain the polymer. Polymerization activity and performance parameters of the polymer are shown in Table 1.

Comparative Example 3

An 1 L stainless steel polymerization kettle equipped with a mechanical stirrer was continuously dried for 6 hours at 130° C., evacuated to vacuum while hot, and replaced with N₂ gas for 3 times. 500 mL of hexane was injected into the polymerization system, and meanwhile 2.5 μmol (1.6 mg) of complex h, 30 mmol (5.1 mL) of 2-methyl-2-hydroxyl-7-octene, 30 mL of AlEt₃ (1.0 mol/L of hexane solution), and 3 mL of MAO (1.53 mol/L toluene solution) were added. The reaction was performed for 30 min by stirring at 60° C. and at an ethylene pressure of 10 atm. Finally, an ethanol solution acidified with 5% by volume hydrochloric acid was used for neutralization so as to obtain the polymer. Polymerization activity and performance parameters of the polymer are shown in Table 1.

Comparative Example 4

An 1 L stainless steel polymerization kettle equipped with a mechanical stirrer was continuously dried for 6 hours at 130° C., evacuated to vacuum while hot, and replaced with N₂ gas for 3 times. 500 mL of hexane was injected into the polymerization system, and meanwhile 2.5 μmol (2.7 mg) of complex g, 30 mmol (5.1 mL) of 2-methyl-2-hydroxyl-7-octene, 30 mL of AlEt₃ (1.0 mol/L of hexane solution), and 3 mL of MAO (1.53 mol/L toluene solution) were added. The reaction was performed for 30 min by stirring at 20° C. and at an ethylene pressure of 10 atm. Finally, an ethanol solution acidified with 5% by volume hydrochloric acid was used for neutralization so as to obtain the polymer. Polymerization activity and performance parameters of the polymer are shown in Table 1.

Comparative Example 5

An 1 L stainless steel polymerization kettle equipped with a mechanical stirrer was continuously dried for 6 hours at 130° C., evacuated to vacuum while hot, and replaced with N₂ gas for 3 times. 500 mL of toluene was injected into the polymerization system, and meanwhile 2.5 μmol (1.6 mg) of complex a1, 30 mmol (5.1 mL) of 2-methyl-2-hydroxyl-7-octene, 30 mL of AlEt₃ (1.0 mol/L of hexane solution), and 3 mL of MAO (1.53 mol/L toluene solution) were added. The reaction was performed for 30 min by stirring at 20° C. and at an ethylene pressure of 10 atm. Finally, an ethanol solution acidified with 5% by volume hydrochloric acid was used for neutralization so as to obtain the polymer. Polymerization activity and performance parameters of the polymer are shown in Table 1.

Comparative Example 6

An 1 L stainless steel polymerization kettle equipped with a mechanical stirrer was continuously dried for 6 hours at 130° C., evacuated to vacuum while hot, and replaced with N₂ gas for 3 times. 500 mL of hexane was injected into the polymerization system, and meanwhile 2.5 μmol (1.6 mg) of complex a1, 30 mmol (6.0 mL) of 10-hendecen-1-ol, 30 mL of AlEt₃ (1.0 mol/L of hexane solution), and 3 mL of MAO (1.53 mol/L toluene solution) were added. The reaction was performed for 30 min by stirring at 20° C. and at an ethylene pressure of 10 atm. Finally, an ethanol solution acidified with 5% by volume hydrochloric acid was used for neutralization so as to obtain the polymer. Polymerization activity and performance parameters of the polymer are shown in Table 1.

TABLE 1

| Serial Number | Complex | Polymerization Activity $10^6$ g/mol Ni/h | Mw (ten thousand) | PDI | Alcohol Content (mol %) | Melting Point (° C.) | Whether there are spherical and/or spherical-like polymers in the copolymer | Density$^a$ (g · cm$^{-3}$) | Density$^b$ (g · cm$^{-3}$) | Average particle size of the spherical and/or spherical-like polymers (mm) |
|---|---|---|---|---|---|---|---|---|---|---|
| Example 1 | a1 | 15.4 | 35.8 | 2.17 | 0.48 | 123.6 | Yes | 0.924 | 0.503 | 3.4 |
| Example 2 | a1 | 20.4 | 46.7 | 2.19 | 0.93 | 122.3 | Yes | 0.923 | 0.502 | 3.0 |
| Example 3 | a1 | 16.4 | 16.1 | 1.98 | 0.96 | 50.2 | No | 0.882 | 0.872 | — |
| Example 4 | a1 | 14.6 | 30.3 | 2.13 | 0.93 | 120.2 | Yes | 0.923 | 0.503 | 2.8 |
| Example 5 | a1 | 9.7 | 20.6 | 2.14 | 0.94 | 120.3 | Yes | 0.923 | 0.503 | 2.8 |
| Example 6 | a1 | 10.4 | 9.3 | 2.42 | 0.83 | — | No | 0.867 | 0.877 | — |
| Example 7 | a1 | 22.7 | 60.2 | 2.03 | 1.82 | 124.5 | Yes | 0.924 | 0.503 | 2.6 |
| Example 8 | a1 | 12.2 | 67.7 | 2.13 | 3.43 | 124.8 | Yes | 0.924 | 0.502 | 2.5 |
| Example 9 | a1 | 14.3 | 22.4 | 2.16 | 0.94 | 116.4 | Yes | 0.922 | 0.516 | 1.7 |
| Example 10 | b1 | 26.6 | 10.7 | 2.34 | 1.06 | 125.2 | Yes | 0.926 | 0.544 | 2.0 |
| Example 11 | b1 | 27.4 | 13.3. | 2.12 | 2.21 | 126.7 | Yes | 0.926 | 0.544 | 1.8 |
| Example 12 | b1 | 17.9 | 7.2 | 2.27 | 0.85 | 123.4 | Yes | 0.925 | 0.541 | 1.3 |
| Example 13 | c1 | 20.3 | 46.3 | 2.04 | 0.91 | 122.2 | Yes | 0.923 | 0.502 | 3.1 |
| Example 14 | a1 | 19.8 | 41.7 | 2.32 | 0.94 | 120.8 | Yes | 0.923 | 0.503 | 2.4 |
| Example 15 | a1 | 8.6 | 20.2 | 3.27 | 0.72 | 122.1 | Yes | 0.923 | — | 1.7 |
| Example 16 | a1 | 18.2 | 25.4 | 2.12 | 0.92 | 122.1 | Yes | 0.923 | 0.484 | 8.4 |
| Comparative Example 1 | a1 | 11.7 | 28.4 | 2.25 | — | 121.4 | No | 0.920 | 0.916 | — |
| Comparative Example 2 | h | 4.6 | 42.2 | 3.48 | 0.32 | 117.3 | No | 0.916 | 0.908 | — |
| Comparative Example 3 | h | 1.6 | 13.3 | 3.14 | 0.22 | 44.7 | No | 0.869 | 0.844 | — |
| Comparative | g | 0.4 | 3.6 | 3.37 | 0.20 | 106.2 | No | 0.914 | 0.901 | — |

TABLE 1-continued

| Serial Number | Complex | Polymerization Activity 10⁶ g/mol Ni/h | Mw (ten thousand) | PDI | Alcohol Content (mol %) | Melting Point (° C.) | Whether there are spherical and/or spherical-like polymers in the copolymer | Density$^a$ (g·cm$^{-3}$) | Density$^b$ (g·cm$^{-3}$) | Average particle size of the spherical and/or spherical-like polymers (mm) |
|---|---|---|---|---|---|---|---|---|---|---|
| Example 4 Comparative Example 5 | a1 | 21.7 | 45.4 | 2.10 | 0.94 | 122.3 | No | 0.923 | 0.918 | — |
| Comparative Example 6 | a1 | 22.6 | 48.7 | 2.11 | 0.98 | 122.0 | No | 0.923 | 0.914 | — |

Density$^a$ (g·cm$^{-3}$) is tested by using GB/T1033-1986.
Density$^b$ (g·cm$^{-3}$) is tested by using GB/T6463-2009.

It should be noted that the embodiments described above are only used to explain the present invention, and do not constitute any limitation to the present invention. The present invention has been described with reference to exemplary embodiments, but it should be understood that words used herein are descriptive and explanatory words, not limiting words. Modifications can be made to the present invention within the scope of the claims of the present invention according to provisions, and revisions can be made to the present invention without departing from the scope and spirit of the present invention. Although the present invention described relates to specific methods, materials, and embodiments, it does not mean that the present invention is limited to the specific examples disclosed herein, but rather the present invention can be extended to all other methods and applications having the same function.

The invention claimed is:

1. An olefin-olefinic alcohol copolymer, comprising a plurality of polymeric particles, wherein one or more of the plurality of polymeric particle is spherical in shape and has a cavity therein,
wherein the copolymer comprises a structural unit derived from olefin and a structural unit of Formula I:

Formula I wherein, in Formula I, L1-L3 each is independently selected from the group consisting of H and $C_1$-$C_{30}$ alkyl, and L4 is $C_1$-$C_{30}$ alkylene having a side group, the $C_1$-$C_{30}$ alkyl being optionally substituted by a substituent.

2. The copolymer according to claim 1, wherein the structural unit of Formula I is derived from an olefinic alcohol selected from a group consisting of 2-methyl-3-buten-1-ol, 2-ethyl-3-buten-1-ol, 1,1-diphenyl-3-buten-1-ol, 2-methyl-3-buten-2-ol, 2,2-dimethyl-3-buten-1-ol, 3-methyl-1-penten-3-ol, 2,4-dimethyl-4-penten-2-ol, 4-alkenyl-2-pentanol, 4-methyl-4-penten-2-ol, 2-methyl-4-penten-2-ol, 2-phenyl-4-penten-2-ol, hexafluoroisopropanol, 2-hydroxyl-5-hexene, 3-buten-2-ol, 3-methyl-5-hexen-3-ol, 2-methyl hydroxyl-5-hexene, 1-allylcyclohexanol, 2,3-dimethyl-2-hydroxyl-5-hexene, 1-heptylen-4-ol, 4-methyl-1-heptylen-4-ol, 4-n-propyl-1-heptyl-4-ol, 6-heptylen-3-ol, 2-methyl-2-hydroxyl heptylene, 5-methyl-2-hydroxyl-6-heptylene, 2-hydroxyl-3-methyl-6-heptylene, 2-hydroxyl ethyl-6-heptylene, 2-hydroxyl-4-methyl-6-heptylene, 2-hydroxyl-5-methyl-6-heptylene, 2,5-dimethyl-1-heptylen-4-ol, 2,6-dimethyl-7-octylene-2-ol, 2-hydroxyl-2,4,5-trimethyl-6-heptylene, 2-methyl-3-hydroxyl-7-octylene, 3-methyl-3-hydroxyl-6-heptylene, 2-methyl-2-hydroxyl-7-octylene, 3-methyl-3-hydroxyl-7-octylene, 4-methyl-2-hydroxyl-7-octylene, 4-methyl-3-hydroxyl-7-octylene, 5-methyl-3-hydroxyl-7-octylene, 6-methyl-3-hydroxyl-7-octylene, 3-ethyl-3-hydroxyl-7-octylene, 1,2-dihydroxyl-7-octylene, 2,6-dimethyl-2,6-dihydroxyl-7-octylene, 2,6-dimethyl-2,3-dihydroxyl-7-octylene, 2-methyl-2-hydroxyl-3-chloro-7-octylene, 2-methyl-2-hydroxyl-3,5-dichloro-7-octylene, 3,4-dimethyl-4-hydroxyl-8-nonylene, 4-methyl-4-hydroxyl-8-nonylene, 4-ethyl-4-hydroxyl-8-nonylene, 4-propyl-4-hydroxyl-8-nonylene, 7-octylene-2-ol, 3,5-dichloro-2-methyl-7-octylen-2-ol, 3-chloro-2-methyl-7-octylen-2,3-diol, and 2,6-dimethyl-7-octylen-2,6-diol.

3. The copolymer according to claim 1, wherein a density of the polymeric particles is 0.3000-0.7500 g/cm³, measured according to GB/T6343-2009.

4. The copolymer according to claim 1, wherein an average particle size of the plurality of polymeric particles is 0.1-50.0 mm, and/or a volume of the cavity in each polymeric particle is 5-99% of a volume of the polymeric particle.

5. The copolymer according to claim 1, wherein each polymeric particle comprises a plurality of microsphere particles, and based on a total weight of the copolymer, a content of the plurality of microsphere particles is 5-70 wt %.

6. The copolymer according to claim 5, wherein an average particle size of the microsphere particles is 0.1-5.0 µm.

7. The copolymer according to claim 1, wherein, in the copolymer, a content of the structural unit derived from the olefinic alcohol of Formula I is 0.4-30.0 mol %.

8. The copolymer according to claim 1, wherein the structural unit derived from olefin is selected from the group consisting of a structural unit derived from $C_2$-$C_{16}$ α-olefin and a structural unit derived from $C_3$-$C_{16}$ cycloolefin.

9. A preparation method for the olefin-olefinic alcohol copolymer according to claim 1, comprising contacting an olefin and an olefinic alcohol of Formula II with a catalyst and optionally a chain transfer agent for reaction in the presence of an alkane solvent in a reaction system to obtain the copolymer:

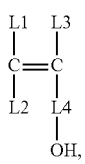

Formula II wherein, in Formula II, definitions of L1-L4 are the same as the definitions of L1-L4 in Formula I; and the catalyst comprises a first catalyst and a co-catalyst, wherein the first catalyst is one or more metal complex of Formula III:

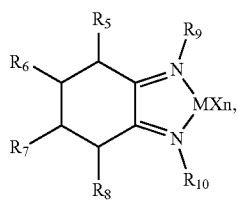

Formula III wherein, in Formula III, $R_9$ and $R_{10}$ each is independently selected from the group consisting of H, halogen, and substituted or unsubstituted hydrocarbyl, and optionally form a ring with each other; M is a Group VIII metal; X is one or more selected from the group consisting of halogen, hydrocarbyl, and hydrocarbyloxy; and n is an integer that meets an M valence state.

10. The preparation method according to claim 9, wherein, in Formula III, $R_9$ and $R_{10}$ each is independently selected from the group consisting of substituted or unsubstituted $C_6$-$C_{30}$ aryl and substituted or unsubstituted $C_7$-$C_{30}$ aralkyl; $R_5$-$R_8$ are identical to or different from each other, each is independently selected from the group consisting of H and $C_1$-$C_{20}$ hydrocarbyl, and optionally form a ring with each other; M is a Group VIII metal; X is one or more selected from the group consisting of halogen and $C_1$-$C_{10}$ hydrocarbyl; and n is an integer that meets an M valence state.

11. The preparation method according to claim 9, wherein the catalyst is selected from at least one metal complex shown in Formula IV:

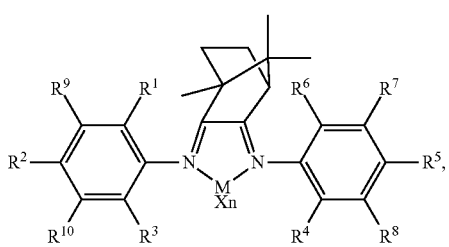

Formula IV wherein, in Formula IV, $R^1$-$R^{10}$ are identical to or different from each other, and each is independently selected from the group consisting of H, halogen, $C_1$-$C_{24}$ hydrocarbyl, and $C_1$-$C_{24}$ hydrocarbyloxy, $R^1$-$R^3$, $R^9$, and $R^{10}$ optionally forming a ring, $R^4$-$R^6$, $R^7$, and $R^8$ optionally forming a ring; and M, X, and n have the same definitions as those in Formula III.

12. The preparation method according to claim 11, wherein, in Formula IV, $R^7$-$R^{10}$ are H, and $R^1$-$R^6$ are identical to or different from each other and each is independently selected from the group consisting of H and $C_1$-$C_6$ alkyl.

13. The preparation method according to claim 9, wherein the M is nickel.

14. The preparation method according to claim 9, wherein the co-catalyst is selected from the group consisting of an organic aluminum compound and an organic boron compound; the organic aluminum compound is one or more selected from the group consisting of alkyl aluminoxane, alkylaluminum, and alkylaluminum halides; and/or the organic boron compound is selected from the group consisting of arylboron and borate.

15. The preparation method according to claim 9, wherein a concentration of the first catalyst in the reaction system is 0.00001-100 mmol/L; when the co-catalyst is the organic aluminum compound, a molar ratio of aluminum in the co-catalyst and M in the first catalyst is 10:1 to 10000000:1; and when the co-catalyst is the organic boron compound, a molar ratio of boron in the co-catalyst and M in the first catalyst is 0.1:1 to 1000:1.

16. The preparation method according to claim 9, wherein the chain transfer agent is one or more selected from the group consisting of aluminum alkyl, magnesium alkyl, and zinc alkyl.

17. The preparation method according to claim 9, wherein a molar ratio of the chain transfer agent and M in the first catalyst is 0.1:1 to 2000:1.

18. The preparation method according to claim 9, wherein a concentration of the olefinic alcohol monomer of Formula II in the reaction system is 0.01-6000 mmol/L.

19. The preparation method according to claim 9, wherein reaction conditions comprise: a reaction temperature ranging from −50° C. to 50° C., and/or a reaction time of 10-200 min.

20. A foaming polyolefin material comprising the copolymer according to claim 1.

21. The copolymer according to claim 1, wherein, in Formula I, L1 and L2 are H, L3 is selected from the group consisting of H, $C_1$-$C_{10}$ alkyl, and $C_1$-$C_{10}$ alkyl substituted by halogen, L4 is a $C_1$-$C_{10}$ alkylene having a side group.

22. The copolymer according to claim 21, wherein the side group is one or more selected from the group consisting of halogen, $C_6$-$C_{10}$ aryl, and $C_1$-$C_{10}$ alkyl.

23. The copolymer according to claim 1, wherein a volume of the cavity in the spherical polymer having a cavity therein is 30-95%.

24. The copolymer according to claim 1, wherein, in the copolymer, a content of the structural unit derived from the olefinic alcohol of Formula I is 0.7-10.0 mol %.

* * * * *

UNITED STATES PATENT AND TRADEMARK OFFICE
CERTIFICATE OF CORRECTION

PATENT NO. : 11,584,843 B2
APPLICATION NO. : 16/759193
DATED : February 21, 2023
INVENTOR(S) : Rong Gao et al.

It is certified that error appears in the above-identified patent and that said Letters Patent is hereby corrected as shown below:

In the Claims

Column 21, Claim 9, Lines 32-38:
"wherein, in Formula III, R9 and R10 each is independently selected from the group consisting of H, halogen, and substituted or unsubstituted hydrocarbyl, and optionally form a ring with each other; M is a Group VIII metal; X is one or more selected from the group consisting of halogen, hydrocarbyl, and hydrocarbyloxy; and n is an integer that meets an M valence state."

Should read:
--wherein, in Formula III, R9 and R10 each is independently selected from the group consisting of substituted or unsubstituted hydrocarbyl; R5-R8 are identical to or different from each other, each is independently selected from the group consisting of H, halogen, and substituted or unsubstituted hydrocarbyl, and optionally form a ring with each other; M is a Group VIII metal; X is one or more selected from the group consisting of halogen, hydrocarbyl, and hydrocarbyloxy; and n is an integer that meets an M valence state.--

Signed and Sealed this
Twenty-second Day of August, 2023

Katherine Kelly Vidal
*Director of the United States Patent and Trademark Office*